United States Patent [19]

Yanagita et al.

[11] Patent Number: 5,070,506
[45] Date of Patent: Dec. 3, 1991

[54] HALIDE LASER GLASS AND LASER DEVICE UTILIZING THE GLASS

[75] Inventors: Hiroaki Yanagita, Hino; Keiko Okada, Akishima, both of Japan

[73] Assignee: Hoya Corporation, Tokyo, Japan

[21] Appl. No.: 587,945

[22] Filed: Sep. 24, 1990

[30] Foreign Application Priority Data

Sep. 29, 1989 [JP] Japan .................................. 1-254848
Aug. 22, 1990 [JP] Japan .................................. 2-220534

[51] Int. Cl.⁵ .............................................. H01S 3/17
[52] U.S. Cl. ...................................... 372/40; 359/333
[58] Field of Search ...................... 372/39, 40; 330/4.3

[56] References Cited

U.S. PATENT DOCUMENTS 4,120,814 10/1978 Izumitani et al. ...................... 372/40
4,225,459  9/1980 Faulstich et al. ...................... 372/40
4,371,965  2/1983 Lempicki et al. ...................... 372/40

Primary Examiner—James W. Davie
Attorney, Agent, or Firm—Nixon & Vanderhye

[57] ABSTRACT

Disclosed is halide laser glass which comprises cationic components and anionic components. The cationic components are constituted by: Al ions; Zr ions and/or Hf ions; at least one kind of ions selected from the first group consisting of Ca ions, Sr ions and Ba ions; at least one kind of ions selected from the second group consisting of Mg ions, Y ions and alkali metal ions; and Er ions, the cationic components being present within the ranges: Al ions in a range of from 20 to 45 mol %, Zr ions and/or Hf ions in a range of from 0.5 to 25 mol %, Ca ions in a range of from 0 to 42 mol %, Sr ions in a range of from 0 to 25 mol %, Ba ions in a range of from 0 to 25 mol % in a total amount of the first group cations within the range of 20 to 70 mol %, Mg ions in a range of from 0 to 15 mol %, Y ions in a range of from 0 to 20 mol %, alkali metal ions in a range of from 0 to 20 mol % in a total amount of the second group cations within the range of 2 to 50 mol %, and Er ions in a range of from 6 to 25 mol %, while the anionic components are constituted by F ions or F ions and Cl ions, the anionic components being present within the ranges: F ions in a range of from 90 to 100 mol %, and Cl ions in a range of from 0 to 10 mol %. The cationic components may further contain Ho ions in a range of from 0.1 to 5 mol %. Further disclosed is a laser device having, as a laser medium, the halide laser glass as described above.

9 Claims, 6 Drawing Sheets

HALIDE LASER GLASS AND LASER DEVICE UTILIZING THE GLASS

BACKGROUND OF THE INVENTION

1. Field of the Invention

The present invention relates to halide laser glass and a laser device utilizing the glass. In particular, the halide laser glass and the laser device utilizing the glass according to the present invention can be used in medical lasers, light source lasers for optical communication and optical measurement, and the like.

2. Prior Art

Light having 3 μm-band wavelength which coincides with water-absorption band wavelength has been utilized in medical lasers such as a laser surgical knife and the like in recent years. Further, the light has been utilized in light source lasers (requiring low loss) for optical communication and optical measurement, and the like, because the wavelength is long as 3 μm.

Examples of the laser having an oscillation wavelength of about 3 μm include crystal lasers such as an Er-$CaF_2$ laser (oscillation wavelength: 2.8 μm), an Er-$YLiF_4$ laser (oscillation wavelength: 2.8 μm) and an Er-YAG laser (oscillation wavelength: 2.94 μm). Further, in recent years, laser glass (oscillation wavelength: 2.78 μm) prepared by doping fluoride glass mainly containing zirconium fluoride with Er ions has been found [Electronics Letters, vol. 24, page 320, 1988].

Further, it has been discussed that laser glass prepared by doping Th-containing fluoride glass with Er ions and Ho ions may be applied to a 2 μm-band Ho laser [IEE J. Quantum Electronics, vol. 25, page 88, 1989].

Of those lasers, the fluoride glass doped with Er ions has an advantage in that a uniform and large-size material can be obtained relatively easily compared with the crystal lasers. In general, the oscillation threshold can be reduced by increasing the concentration of Er ions used for doping the matrix glass. Accordingly, the fluoride glass has an advantage in that the concentration of Er ions in the fluoride glass can be increased easily by increasing the proportion of Er compounds ($ErF_3$) used as a raw material, if the concentration can be established to be within a certain range.

However, the conventional laser glass prepared by doping fluoride glass mainly containing zirconium fluoride, with Er ions has a disadvantage in that the amount of $ErF_3$ as a material for Er ions used for doping the matrix glass is limited to about 6 mol %. The reason is as follows. When the $ErF_3$ content is not less than 6 mol %, the glass is crystallized so easily that glass as a good laser medium cannot be obtained. Accordingly, it is difficult that the oscillation threshold of the aforementioned laser glass is further reduced by increasing the concentration of Er ions used for doping.

Further, the aforementioned laser glass has a problem in that the laser glass is too low in mechanical strength and chemical durability to be put into practice, because fluoride glass mainly containing zirconium fluoride is used as a matrix.

Further, the glass prepared by doping Th-containing fluoride glass, with Er and Ho ions has a problem in that the glass is danger for a person, because the essential component Th of the glass is a radioactive substance.

SUMMARY OF THE INVENTION

A first object of the present invention is therefore to provide halide laser glass doped with Er ions, which is safe upon a person, excellent in mechanical strength and chemical durability and low in the oscillation threshold thereof.

A second object of the present invention is to provide halide laser glass doped with Er ions, which is safe upon a person, excellent in mechanical strength and chemical durability, low in the oscillation threshold thereof and stable in the output of a laser using the glass.

A third object of the present invention is to provide a laser device using the Er ion-doped halide laser glass as a laser medium.

In order to attain the above first object, according to a first aspect of the present invention, the halide laser glass comprises cationic components and anionic components, in which the cationic components are constituted by: Al ions; Zr ions and/or Hf ions; at least one kind of ions selected from the first group consisting of Ca ions, Sr ions and Ba ions; at least one kind of ions selected from the second group consisting of Mg ions, Y ions and alkali metal ions; and Er ions, the cationic components being present within the ranges: Al ions in a range of from 20 to 45 mol %, Zr ions and/or Hf ions in a range of from 0.5 to 25 mol %, Ca ions in a range of from 0 to 42 mol %, Sr ions in a range of from 0 to 25 mol %, Ba ions in a range of from 0 to 25 mol % in a total amount of the first group cations within the range of 20 to 70 mol %, Mg ions in a range of from 0 to 15 mol %, Y ions in a range of from 0 to 20 mol %, alkali metal ions in a range of from 0 to 20 mol % in a total amount of the second group cations within the range of 2 to 50 mol %, and Er ions in a range of from 6 to 25 mol %, and in which the anionic components are constituted by F ions or F ions and Cl ions, the anionic components being present within the ranges: F ions in a range of from 90 to 100 mol %, and Cl ions in a range of from 0 to 10 mol %.

In order to attain the above second object, according to a second aspect of the present invention, the halide laser glass comprises cationic components and anionic components, in which the cationic components are constituted by: Al ions; Zr ions and/or Hf ions; at least one kind of ions selected from the first group consisting of Ca ions, Sr ions and Ba ions; at least one kind of ions selected from the second group consisting of Mg ions, Y ions and alkali metal ions; Er ions; and Ho ions, the cationic components being present within the ranges: Al ions in a range of from 20 to 45 mol %, Zr ions and/or Hf ions in a range of from 0.5 to 25 mol %, Ca ions in a range of from 0 to 42 mol %, Sr ions in a range of from 0 to 25 mol %, Ba ions in a range of from 0 to 25 mol % in a total amount of the first group cations within the range of 20 to 70 mol %, Mg ions in a range of from 0 to 15 mol %, Y ions in a range of from 0 to 20 mol %, alkali metal ions in a range of from 0 to 20 mol % in a total amount of the second group cations within the range of 2 to 50 mol %, Er ions in a range of from 6 to 25 mol %, and Ho ions in a range of from 0.1 to 5 mol %, and in which the anionic components are constituted by F ions or F ions and Cl ions, the anionic components being present within the ranges: F ions in a range of from 90 to 100 mol %, and Cl ions in a range of from 0 to 10 mol %.

In order to attain the above third object, according to a third aspect of the present invention, the laser device has, as a laser medium, the halide laser glass according to the first or second aspect of the present invention.

DETAILED DESCRIPTION OF THE INVENTION

Figure 1:
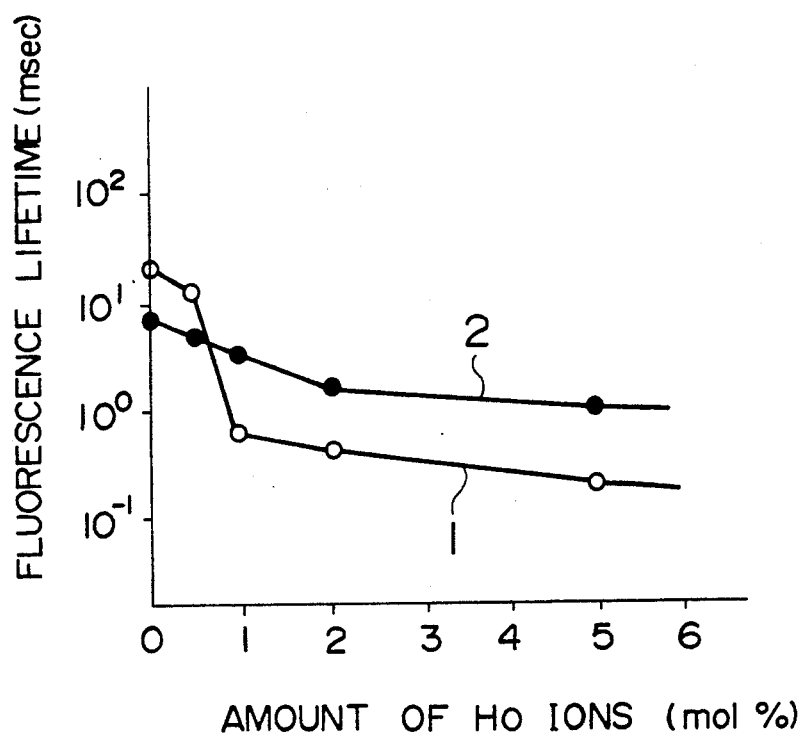
FIG. 1 is a graph view showing the relationship between the amount of Ho ions contained in halide laser glass as prepared in Examples 6, 19, 20, 21 and 22 and the fluorescence lifetime in the $^4I_{11}$ level and $^4I_{13/2}$ level of Er ions.

The present invention will be described below in detail.

In the halide laser glass according to the first and second aspects of the present invention, the amounts of the cationic components and the amounts of the anionic components are restricted as described above for the reasons as follows.

When the content of each of the cationic components except Er ions and Ho ions is out of the restricted ranges, crystallization occurs so excessively that stable glass cannot be obtained. At the same time, the resulting glass deteriorates in mechanical strength and chemical durability.

When the content of Er ions of the halide laser glass is less than the lower limit of the restricted range, the oscillation threshold cannot be reduced compared with the conventional laser glass, when it exceeds the upper limit of the restricted range, the resulting glass is crystallized excessively, and further, it is, undesirably, difficult to obtain efficient oscillation because of concentration quenching.

In the halide laser glass according to the second aspect of the present invention, the content of Ho ions is restricted as described above for the reasons as follows.

When the content of Ho ions is less than the lower limit of the restricted range, the effect for improvement of the stability of the output of the Er laser is little. When the content of Ho ions exceeds the upper limit of the restricted range, the effect for quenching in the laser-transition initial level of Er is so excessive that the input-output characteristic deteriorates undesirably. When Ho ions within the range of 0.8 to 5 mol % are present with Er ions, the fluorescence lifetime of the laser-transition initial level and terminal level of Er can be inverted so effectively that halide laser glass stable in the laser output can be obtained.

The preferred contents of the respective cationic components contained in the halide laser glass according to the first or second aspect of the present invention are within the ranges: Al ions in a range of from 26 to 40 mol %, Zr ions and/or Hf ions in a range of from 3 to 20 mol %, Ca ions in a range of from 10 to 38 mol %, Sr ions in a range of from 3 to 20 mol %, Ba ions in a range of from 3 to 22 mol % in a total amount of Ca, Sr and Ba ions within the range of 30 to 50 mol %, Mg ions in a range of from 0 to 10 mol %, Y ions in a range of from 0 to 15 mol %, alkali metal ions in a range of from 0 to 15 mol % in a total amount of Mg, Y and alkali metal ions within the range of 5 to 25 mol %, Er ions in a range of from 6 to 20 mol %, and Ho ions in a range of from 0.8 to 1.5 mol % (in the case where Ho ions are contained).

Further, Cl ions in anionic components contained in the glass are present within the range of 0 to 10 mol % for the reasons as follows.

When Cl ions are present, the resulting glass can be improved in resistance against devitrification. However, when the content of Cl ions exceeds the upper limit (10 mol %), precipitation of crystals or phase separation occurs so easily that stable glass cannot be obtained undesirably. The preferred content of Cl ions in anionic components is within the range of 0 to 8 mol %.

The laser device according to the third aspect of the present invention includes, as a laser medium, the halide laser glass according to the first or second aspect of the present invention. The laser device may be constituted merely by a laser oscillator, merely by an optical amplifier, or by a combination of a laser oscillator and an optical amplifier.

Examples of the laser oscillator which is one form of the laser device according to the third aspect of the present invention include a mode-locked oscillator, a repeated pulse oscillator, a continuous oscillator, and the like. The halide laser glass according to the first aspect or the second aspect of the present invention is formed like a plate, a rod, a disk, an optical fiber or the like in accordance with the kind of the laser oscillator to be requested. The laser device according to the third aspect of the present invention is attained by installing the laser glass as a laser medium in these laser oscillators. According to these laser oscillators, laser light having a wavelength of 2.7 to 2.8 μm can be obtained.

Examples of the optical amplifier which is another form of the laser device according to the third aspect of the present invention include a rod amplifier, a disk amplifier, a reflector amplifier, and the like. The halide laser glass according to the first aspect or the second aspect of the present invention is formed like a rod, a disk, an optical fiber or the like in accordance with the kind of the optical amplifier to be requested. The laser device according to the third aspect of the present invention is attained by installing the laser glass as a laser medium in these optical amplifiers. According to these optical amplifiers, laser light having a wavelength of 2.7 to 2.8 μm can be amplified. Examples of the laser light having a wavelength of 2.7 to 2.8 μm to be amplified are laser light from an HF laser having an oscillation wavelength of 2.7 to 2.8 μm, laser light from an Er-CaF$_2$ laser, laser light from an Er-YLiF$_4$ laser, laser light from the aforementioned laser oscillator according to the third aspect of the present invention, and the like.

The laser oscillator or optical amplifier may be used in combination with another laser oscillator or optical amplifier.

In the laser device according to the third aspect of the present invention, an xenon lamp, a krypton lamp or the like can be used as a light source for exciting the halide laser glass as a laser medium according to the first aspect or the second aspect of the present invention. Because Er$^{3+}$ exhibits absorption maxima at about 360 nm, about 380 nm, about 405 nm, about 450 nm, about 485 nm, about 520 nm, about 540 nm, about 670 nm, about 800 nm and about 980 nm, laser diodes having oscillation wavelengths equal to these wavelength bands can be used.

These excitation light sources can be selected in accordance with the characteristic of the laser device to be requested.

The following examples serve to illustrate the preferred embodiments of the present invention. However, the present invention is not limited to the following examples.

EXAMPLES

Example 1: Halide laser glass according to the first aspect of the present invention Fluorides AlF$_3$, ZrF$_4$, CaF$_2$, SrF$_2$, BaF$_2$, MgF$_2$, YF$_3$, NaF and ErF$_3$ as starting materials were weighed and mixed to prepare 40 g of a material batch for glass finally having cationic components being present in the proportions: Al ions in an amount of 25.10 mol %, Zr ions in an amount of 12.80 mol %, Ca ions in an amount of 15.40 mol %, Sr ions in an amount of 13.60 mol %, Ba ions in an amount of 12.60 mol % in a total amount of Ca, Sr and Ba ions of 41.60 mol %, Mg ions in an amount of 3.70 mol %, Y ions in an amount of 5.10 mol %, Na ions in an amount of 5.70 mol % in a total amount of Mg, Y and Na ions of 14.50 mol %, and Er ions in an amount of 6.00 mol %, and anionic components being present in the proportion: F ions in an amount of 100.00 mol %.

The material batch was placed in a carbon crucible and melted for 2 hours at 975° C. in a furnace supplied with 2 l/min of argon gas and 50 cc/min of nitrogen trifluoride to prepare a glass melt.

The glass melt was cooled rapidly to 390° C. and then cooled slowly to prepare disk-like halide laser glass having a size of 30 mmφ×10 mm.

The halide laser glass was cut into a size of 20×10×5 mm and polished for six planes. Then, the halide laser glass was observed with a microscope. As a result, precipitation of crystals in the inside of the glass was not found.

The Knoop hardness of the halide laser glass and the weight loss in water after immersion into boiling water for one hour were measured according to Japanese Optical Glass Industry Standard JOGIS-1975. As a result, the Knoop hardness and weight loss in water were 317 kg/mm$^2$ and 0.24 wt %, respectively. In short, it was found that the halide laser glass was excellent in mechanical strength and chemical durability.

To examine the characteristic of the halide laser glass as a laser medium, the halide laser glass was cut into a size of 10×10×2 mm and polished for two planes having a size of 10×10 mm to prepare a sample. The light transmission spectrum of the sample in the range of 400 nm to 2 μm was measured. From the result, the branching ratio in transition from the $^4I_{11}$ level to the $^4I_{1\ 3/2}$ level of Er ions and the lifetime of radiation of the $^4I_{11}$ were calculated by Judd-Ofelt theory.

Further, by using the aforementioned sample polished for six planes, the fluorescence lifetime in the $^4I_{11}$ level and $^4I_{1\ 3/2}$ level of Er ions was measured. In the measurement, an xenon flash lamp having a flash width of about 100 μsec was used as an excitation light source. In the measurement of the fluorescence lifetime of the $^4I_{11}$ level, an infrared-transmitting filter not passing light having a wavelength of 830 nm or less was used for excitation of the $^4I_{11}$ level. In the measurement of the fluorescence lifetime of the $^4I_{1\ 3/2}$ level, a filter passing 1.535 μm-band light in a width of about 30 nm was used for excitation of the $^4I_{1\ 3/2}$ level.

The quantum efficiency in the transition was calculated from the rate of the calculated value for the lifetime of radiation to the measured value for the fluorescence lifetime of $^4I_{11}$ level. The emission efficiency in the transition from $^4I_{1\ 3/2}$ to $^4I_{11}$ in the halide laser glass was calculated from the product of the branching ratio and the quantum efficiency. The result was as shown in Table 1.

TABLE 1

| | |
|---|---|
| Branching ratio (%) | 17 |
| Radiation lifetime (msec) | 9.0 |
| Fluorescence lifetime (msec) | 7.3 |
| Quantum efficiency | 0.8 |
| Emission efficiency (%) | 14 |

From TABLE 1, it is confirmed that the halide laser glass of this Example 1 is a laser glass having an excellent emission efficiency.

Examples 2 to 16: Halide laser glass according to the first aspect of the present invention Fluorides AlF$_3$, ZrF$_4$, HfF$_4$, CaF$_2$, SrF$_2$, BaF$_2$, MgF$_2$, YF$_3$, LiF, NaF, CsF and ErF$_3$ and chlorides BaCl$_2$, NaCl and KCl were used as starting materials. The starting materials were weighed and mixed in the same manner as in Example 1 to finally prepare 30 mmφ×10 mm disk-like halide laser glasses having cationic components and anionic components being present in the proportions (mol %) as shown in Table 2.

The halide laser glasses were observed in the same manner as in Example 1. As a result, precipitation of crystals was not found in the inside and surface of the halide laser glass obtained in any one of Examples 2 to 16.

The emission efficiency, mechanical strength and chemical durability of each halide laser glass were measured. As a result, each halide laser glass was as excellent in emission efficiency, in mechanical strength, and in chemical durability as that obtained in Example 1.

The proportions of the cationic components and anionic components contained in the halide laser glasses were shown in Table 2.

Comparative Example 1

Fluorides AlF$_3$, ZrF$_4$, BaF$_2$, NaF and ErF$_3$ as starting materials were weighed and mixed to prepare 40 g of a material batch for glass finally having cationic components and anionic components being present in the proportions (mol %) as shown in Table 2. As was obvious from Table 2, the amount of Er ions for doping fluoride glass mainly containing zirconium fluoride was particularly high as 6 mol %.

The material batch was placed in a carbon crucible and melted for 2 hours at 875° C. in a furnace supplied with 2 l/min of argon gas and 50 cc/min of nitrogen trifluoride to prepare a glass melt.

The glass melt was cooled rapidly to 270° C. and then cooled slowly to prepare disk-like halide laser glass having a size of 30 mm$\phi \times$ 10 mm.

The resulting glass was observed with naked eyes. As a result, precipitation of crystals was found in the inside and surface of the glass.

Examples 17 to 33: Halide laser glass according to the second aspect of the present invention Fluorides $AlF_3$, $ZrF_4$, $HfF_4$, $CaF_2$, $SrF_2$, $BaF_2$, $MgF_2$, $YF_3$, LiF, NaF, CsF, $ErF_3$ and $HoF_3$ and chlorides $BaCl_2$, NaCl and KCl were used as starting materials. The starting materials were weighed and mixed in the same manner as in Example 1 to finally prepare 30 mm$\phi \times$ 10 mm disk-like halide laser glass having cationic components and anionic components being present in the proportions (mol %) as shown in Table 3.

Each halide laser glass was observed in the same manner as in Example 1. As a result, precipitation of crystals was not found in the inside and surface of the halide laser glass obtained in any one of Examples 17 to 33.

TABLE 2

|  |  | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| *A | Al ion | 25.10 | 30.20 | 29.09 | 29.09 | 25.10 | 25.10 | 43.14 | 38.09 | 20.09 | 26.82 |
|  | Zr ion | 12.80 | 10.20 | — | 4.02 | 12.80 | 12.80 | 10.66 | 1.11 | 23.11 | 2.01 |
|  | Hf ion | — | — | 4.02 | — | — | — | — | — | — | 2.01 |
|  | Sum | 12.80 | 10.20 | 4.02 | 4.02 | 12.80 | 12.80 | 10.66 | 1.11 | 23.11 | 4.02 |
| *1 | Ca ion | 15.40 | 20.30 | 24.96 | 9.00 | 15.40 | 15.40 | 13.20 | 21.66 | 15.09 | 41.96 |
|  | Sr ion | 13.60 | 13.20 | — | — | 13.60 | 13.60 | 9.29 | 14.96 | 14.96 | 11.32 |
|  | Ba ion | 12.60 | 10.50 | 10.32 | 11.32 | 12.60 | 12.60 | 8.76 | 10.32 | 10.32 | 3.18 |
|  | Sum | 41.60 | 44.00 | 35.28 | 20.32 | 41.60 | 41.60 | 31.25 | 46.94 | 40.37 | 56.46 |
| *2 | Mg ion | 3.70 | 3.60 | 6.18 | 6.18 | 3.70 | 3.70 | 2.49 | 4.02 | 4.02 | 4.02 |
|  | Y ion | 5.10 | 2.30 | 0.73 | 15.71 | 1.10 | 1.10 | 2.44 | 1.16 | 3.73 | — |
|  | Li ion | — | — | — | — | — | — | — | — | — | — |
|  | Na ion | 5.70 | 3.70 | 2.68 | 1.68 | 5.70 | 5.70 | 4.02 | 2.68 | 2.68 | 1.68 |
|  | K ion | — | — | 4.02 | — | — | — | — | — | — | 1.00 |
|  | Cs ion | — | — | — | — | — | — | — | — | — | — |
|  | Sum | 5.70 | 3.70 | 6.70 | 1.68 | 5.70 | 5.70 | 4.02 | 2.68 | 2.68 | 2.68 |
|  | Sum | 14.50 | 9.60 | 13.61 | 23.57 | 10.50 | 10.50 | 8.95 | 7.86 | 10.43 | 6.70 |
|  | Er ion | 6.00 | 6.00 | 18.00 | 23.00 | 10.00 | 10.00 | 6.00 | 6.00 | 6.00 | 6.00 |
| *B | F ion | 100.00 | 95.89 | 93.17 | 99.39 | 97.77 | 100.00 | 99.39 | 99.33 | 99.40 | 99.31 |
|  | Cl ion | — | 4.11 | 6.83 | 0.61 | 2.23 | — | 0.61 | 0.67 | 0.60 | 0.69 |

|  |  | Ex. 11 | Ex. 12 | Ex. 13 | Ex. 14 | Ex. 15 | Ex. 16 | Cmp. 1 |
|---|---|---|---|---|---|---|---|---|
| *A | Al ion | 31.82 | 25.59 | 28.09 | 20.08 | 34.09 | 21.59 | 3.00 |
|  | Zr ion | 7.11 | 8.02 | 7.11 | 6.11 | 7.11 | 4.02 | 53.00 |
|  | Hf ion | — | — | — | — | — | — | — |
|  | Sum | 7.11 | 8.02 | 7.11 | 6.11 | 7.11 | 4.02 | 53.00 |
| *1 | Ca ion | — | 9.00 | — | 32.58 | 23.09 | 9.00 | — |
|  | Sr ion | 24.18 | — | 24.18 | 16.10 | 19.96 | 19.98 | — |
|  | Ba ion | 24.19 | 11.32 | 24.19 | 16.30 | — | 11.32 | 20.00 |
|  | Sum | 48.37 | 20.32 | 48.37 | 64.98 | 43.05 | 40.30 | 20.00 |
| *2 | Mg ion | 4.02 | 13.68 | 4.02 | — | 4.02 | 5.68 | — |
|  | Y ion | — | 8.73 | 3.73 | 2.83 | 3.73 | 18.73 | — |
|  | Li ion | — | 2.00 | — | — | — | — | — |
|  | Na ion | 2.68 | 4.66 | 2.68 | — | — | 1.68 | 18.00 |
|  | K ion | — | — | — | — | — | — | — |
|  | Cs ion | — | 2.00 | — | — | — | — | — |
|  | Sum | 2.68 | 8.66 | 2.68 | — | — | 1.68 | 18.00 |
|  | Sum | 6.70 | 31.07 | 10.43 | 2.83 | 7.75 | 26.09 | 18.00 |
|  | Er ion | 6.00 | 15.00 | 6.00 | 6.00 | 8.00 | 8.00 | 6.00 |
| *B | F ion | 99.34 | 96.04 | 95.89 | 100.00 | 100.00 | 99.36 | 100.00 |
|  | Cl ion | 0.66 | 3.96 | 4.11 | — | — | 0.64 | — |

*A — Cation components
*B — Anion components
*1 — First group
*2 — Second group

The emission efficiency, mechanical strength and chemical durability of each halide laser glass were measured. As a result, each halide laser glass was as excellent in emission efficiency, mechanical strength and chemical durability as that obtained in Example 1.

TABLE 3

|  |  | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|
| *A | Al ion | 32.98 | 29.09 | 25.10 | 25.10 | 25.10 | 25.10 | 25.10 | 42.14 | 37.09 |
|  | Zr ion | 1.11 | 2.02 | 12.80 | 12.80 | 12.80 | 12.80 | 12.80 | 10.66 | 1.11 |
|  | Hf ion | — | 2.00 | — | — | — | — | — | — | — |
|  | Sum | 1.11 | 4.02 | 12.80 | 12.80 | 12.80 | 12.80 | 12.80 | 10.66 | 1.11 |
| *1 | Ca ion | 23.09 | 20.11 | 15.40 | 15.40 | 15.10 | 14.00 | 15.40 | 13.20 | 21.66 |
|  | Sr ion | 14.96 | 13.03 | 13.60 | 13.60 | 13.30 | 12.30 | 13.60 | 9.29 | 14.96 |

TABLE 3-continued

|   |   |   |   |   |   |   |   |   |   |   |
|---|---|---|---|---|---|---|---|---|---|---|
|  | Ba ion | 10.32 | 11.57 | 12.60 | 12.60 | 12.30 | 11.40 | 12.60 | 8.76 | 10.32 |
|  | Sum | 48.37 | 44.71 | 41.60 | 41.60 | 40.70 | 37.70 | 41.60 | 31.25 | 46.94 |
| *2 | Mg ion | 4.02 | 3.50 | 3.70 | 3.70 | 3.70 | 3.70 | 3.70 | 2.49 | 4.02 |
|  | Y ion | 0.84 | 1.76 | 0.60 | 0.10 | — | — | 0.10 | 2.44 | 1.16 |
|  | Li ion | 0.18 | — | — | — | — | — | — | — | — |
|  | Na ion | 2.00 | 3.92 | 5.70 | 5.70 | 5.70 | 5.70 | 5.70 | 4.02 | 2.68 |
|  | K ion | — | — | — | — | — | — | — | — | — |
|  | Cs ion | — | 1.00 | — | — | — | — | — | — | — |
|  | Sum | 2.18 | 4.92 | 5.70 | 5.70 | 5.70 | 5.70 | 5.70 | 4.02 | 2.68 |
|  | Sum | 7.04 | 10.18 | 10.00 | 9.50 | 9.40 | 9.40 | 9.50 | 8.95 | 7.86 |
|  | Er ion | 10.00 | 10.00 | 10.00 | 10.00 | 10.00 | 10.00 | 10.00 | 6.00 | 6.00 |
|  | Ho ion | 0.50 | 2.00 | 0.50 | 1.00 | 2.00 | 5.00 | 1.00 | 1.00 | 1.00 |
| *B | F ion | 100.00 | 92.22 | 100.00 | 100.00 | 100.00 | 100.00 | 97.77 | 99.39 | 99.44 |
|  | Cl ion | — | 7.78 | — | — | — | — | 2.23 | 0.61 | 0.56 |

|   |   | Ex. 26 | Ex. 27 | Ex. 28 | Ex. 29 | Ex. 30 | Ex. 31 | Ex. 32 | Ex. 33 |
|---|---|---|---|---|---|---|---|---|---|
| *A | Al ion | 20.09 | 25.82 | 30.82 | 23.59 | 26.59 | 21.58 | 33.09 | 20.59 |
|  | Zr ion | 22.11 | 2.01 | 7.11 | 8.02 | 7.11 | 3.11 | 7.11 | 4.02 |
|  | Hf ion | — | 2.01 | — | — | — | — | — | — |
|  | Sum | 22.11 | 4.02 | 7.11 | 8.02 | 7.11 | 3.11 | 7.11 | 4.02 |
| *1 | Ca ion | 15.09 | 41.96 | — | 9.00 | — | 32.58 | 23.09 | 9.00 |
|  | Sr ion | 14.96 | 11.32 | 24.18 | — | 24.18 | 16.10 | 19.96 | 19.98 |
|  | Ba ion | 10.32 | 3.18 | 24.19 | 11.32 | 24.19 | 16.30 | — | 11.32 |
|  | Sum | 40.37 | 56.46 | 48.37 | 20.32 | 48.37 | 64.98 | 43.05 | 40.30 |
| *2 | Mg ion | 4.02 | 4.02 | 4.02 | 13.68 | 4.02 | — | 4.02 | 5.68 |
|  | Y ion | 3.73 | — | — | 8.73 | 3.73 | 2.83 | 3.73 | 18.73 |
|  | Li ion | — | — | — | 2.00 | — | — | — | — |
|  | Na ion | 2.68 | 1.68 | 2.68 | 4.66 | 2.68 | — | — | 1.68 |
|  | K ion | — | 1.00 | — | — | — | — | — | — |
|  | Cs ion | — | — | — | 2.00 | — | — | — | — |
|  | Sum | 2.68 | 2.68 | 2.68 | 8.66 | 2.68 | — | — | 1.68 |
|  | Sum | 10.43 | 6.70 | 6.70 | 31.07 | 10.43 | 2.83 | 7.75 | 26.09 |
|  | Er ion | 6.00 | 6.00 | 6.00 | 15.00 | 6.00 | 6.00 | 8.00 | 8.00 |
|  | Ho ion | 1.00 | 1.00 | 1.00 | 2.00 | 1.50 | 1.50 | 1.00 | 1.00 |
| *B | F ion | 99.40 | 99.31 | 99.34 | 95.86 | 95.74 | 100.00 | 100.00 | 99.44 |
|  | Cl ion | 0.60 | 0.69 | 0.66 | 4.14 | 4.26 | — | — | 0.56 |

*A — Cation components
*B — Anion components
*1 — First group
*2 — Second group

Each halide laser glass obtained in Example 6 and Examples 19 to 22 was cut into a size of 20×10×5 mm and polished for six planes to prepare samples. By using the samples, the fluorescence lifetime in the $^4I_{11}$ level and $^4I_{13/2}$ level of Er ions was measured in the same manner as in Example 1 while the amount of Ho ions was successively changed to 0 mol. % (Example 6), 0.50 mol % (Example 19), 1.00 mol % (Example 20), 2.00 mol % (Example 21) and 5.00 mol % (Example 22). The results were as shown in FIG. 1. In FIG. 1, the solid line 1 shows the fluorescence lifetime of the $^4I_{13/2}$ level (terminal level), and the solid line 2 shows the fluorescence lifetime of the $^4I_{11}$ level (initial level).

As was obvious from FIG. 1, the inversion of the fluorescence lifetime of the two levels was observed when the amount of Ho ions was not smaller than about 0.8 mol %. In short, it was found that stable population inversion for attaining a very stable laser output can be produced when the amount of Ho ions is not less than 0.8 mol % or larger.

Fluorides and chlorides used in Examples 1 to 33 and the proportions thereof were as shown in Table 4.

TABLE 4

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Cmp. 1 | Ex. 17 |
|---|---|---|---|---|---|---|---|---|---|---|---|---|---|---|---|---|---|---|
| AlF$_3$ | 25.10 | 30.20 | 29.09 | 29.09 | 25.10 | 25.10 | 43.14 | 38.09 | 20.09 | 26.82 | 31.82 | 25.59 | 28.09 | 20.08 | 34.09 | 21.59 | 3.00 | 32.98 |
| ZrF$_4$ | 12.80 | 10.20 | — | 4.02 | 12.80 | 12.80 | 10.66 | 1.11 | 23.11 | 2.01 | 7.11 | 8.02 | 7.11 | 6.11 | 7.11 | 4.02 | 53.00 | 1.11 |
| HfF$_4$ | — | — | — | — | — | — | — | — | — | 2.01 | — | — | — | — | — | — | — | — |
| CaF$_2$ | 15.40 | 20.30 | 24.96 | 9.00 | 15.40 | 15.40 | 13.20 | 21.66 | 15.09 | 41.96 | — | 9.00 | — | 32.58 | 23.09 | 9.00 | — | 23.09 |
| SrF$_2$ | 13.60 | 13.20 | — | — | 13.60 | 13.60 | 9.29 | 14.96 | 14.96 | 11.32 | 24.18 | — | 24.18 | 16.10 | 19.96 | 19.98 | — | 14.96 |
| BaF$_2$ | 12.60 | 5.25 | 5.16 | 11.32 | 12.60 | 12.60 | 8.76 | 10.32 | 10.32 | 3.18 | 24.19 | 6.07 | 18.94 | 16.30 | — | 11.32 | 20.00 | 10.32 |
| BaCl$_2$ | — | 5.25 | 5.16 | — | — | — | — | — | — | — | — | 5.25 | 5.25 | — | — | — | — | — |
| MgF$_2$ | 3.70 | 3.60 | 6.18 | 6.18 | 3.70 | 3.70 | 2.49 | 4.02 | 4.02 | 4.02 | 4.02 | 13.68 | 4.02 | — | 4.02 | 5.68 | — | 4.02 |
| YF$_3$ | 5.10 | 2.30 | 0.73 | 15.71 | 1.10 | 1.10 | 2.44 | 1.16 | 3.73 | — | — | 8.73 | 3.73 | 2.83 | 3.73 | 18.73 | — | 0.84 |
| LiF | — | — | — | — | — | — | — | — | — | — | — | 2.00 | — | — | — | — | — | 0.18 |
| NaF | 5.70 | 3.70 | — | — | — | 5.70 | 2.34 | 1.00 | 1.00 | 1.00 | 1.00 | 4.66 | 2.68 | — | — | — | 18.00 | 2.00 |
| NaCl | — | — | 2.68 | 1.68 | 5.70 | — | 1.68 | 1.68 | 1.68 | 0.68 | 1.68 | — | — | — | — | 1.68 | — | — |
| KCl | — | — | 4.02 | — | — | — | — | — | — | 1.00 | — | — | — | — | — | — | — | — |
| CsF | — | — | — | — | — | — | — | — | — | — | — | — | 2.00 | — | — | — | — | — |
| ErF$_3$ | 6.00 | 6.00 | 18.00 | 23.00 | 10.00 | 10.00 | 6.00 | 6.00 | 6.00 | 6.00 | 6.00 | 15.00 | 6.00 | 6.00 | 8.00 | 8.00 | 6.00 | 10.00 |
| HoF$_3$ | — | — | — | — | — | — | — | — | — | — | — | — | — | — | — | — | — | 0.50 |

|  | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|---|---|---|---|---|---|---|
| AlF$_3$ | 29.09 | 25.10 | 25.10 | 25.10 | 25.10 | 25.10 | 42.14 | 37.09 | 20.09 | 25.82 | 30.82 | 23.59 | 26.59 | 21.58 | 33.09 | 20.59 |
| ZrF$_4$ | 2.02 | 12.80 | 12.80 | 12.80 | 12.80 | 12.80 | 10.66 | 1.11 | 22.11 | 2.01 | 7.11 | 8.02 | 7.11 | 3.11 | 7.11 | 4.02 |
| HfF$_4$ | 2.02 | — | — | — | — | — | — | — | — | 2.01 | — | — | — | — | — | — |
| CaF$_2$ | 20.11 | 15.40 | 15.40 | 15.10 | 14.00 | 15.40 | 13.20 | 21.66 | 15.09 | 41.96 | — | 9.00 | — | 32.58 | 23.09 | 9.00 |

TABLE 4-continued

| | | | | | | | | | | | | | | | | |
|---|---|---|---|---|---|---|---|---|---|---|---|---|---|---|---|---|
| SrF$_2$ | 13.03 | 13.60 | 13.60 | 13.30 | 12.30 | 13.60 | 9.29 | 14.96 | 14.96 | 11.32 | 24.18 | — | 24.18 | 16.10 | 19.96 | 19.98 |
| BaF$_2$ | 2.00 | 12.60 | 12.60 | 12.30 | 11.40 | 12.60 | 8.76 | 10.32 | 10.32 | 3.18 | 24.19 | 6.07 | 18.94 | 16.30 | — | 11.32 |
| BaCl$_2$ | 9.57 | — | — | — | — | — | — | — | — | — | — | 5.25 | 5.25 | — | — | — |
| MgF$_2$ | 3.50 | 3.70 | 3.70 | 3.70 | 3.70 | 3.70 | 2.49 | 4.02 | 4.02 | 4.02 | 4.02 | 13.68 | 4.02 | — | 4.02 | 5.68 |
| YF$_3$ | 1.76 | 0.60 | 0.10 | — | — | 0.10 | 2.44 | 1.16 | 3.73 | — | — | 8.73 | 3.73 | 2.83 | 3.73 | 18.73 |
| LiF | — | — | — | — | — | — | — | — | — | — | — | 2.00 | — | — | — | — |
| NaF | 3.92 | 5.70 | 5.70 | 5.70 | 5.70 | — | 2.34 | 1.00 | 1.00 | 1.00 | 1.00 | 4.66 | 2.68 | — | — | — |
| NaCl | — | — | — | — | — | 5.70 | 1.68 | 1.68 | 1.68 | 0.68 | 1.68 | — | — | — | — | 1.68 |
| KCl | — | — | — | — | — | — | — | — | — | 1.00 | — | — | — | — | — | — |
| CsF | 1.00 | — | — | — | — | — | — | — | — | — | — | 2.00 | — | — | — | — |
| ErF$_3$ | 10.00 | 10.00 | 10.00 | 10.00 | 10.00 | 10.00 | 6.00 | 6.00 | 6.00 | 6.00 | 6.00 | 15.00 | 6.00 | 6.00 | 8.00 | 8.00 |
| HoF$_3$ | 2.00 | 0.50 | 1.00 | 2.00 | 5.00 | 1.00 | 1.00 | 1.00 | 1.00 | 1.00 | 1.00 | 2.00 | 1.50 | 1.50 | 1.00 | 1.00 |

Example 34: Laser device according to the third aspect of the present invention The halide laser glass obtained in Example 1 was cut into a size of 25×5×5 mm and polished to make 5×5 mm opposite end surfaces plane and parallel to each other. The polished glass was used as a laser medium to prepare a laser oscillator as shown in FIG. 2.

Figure 2:
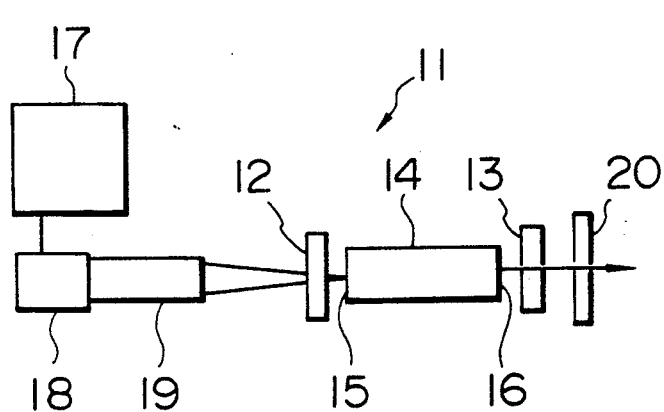
FIG. 2 is a typical diagram showing a laser oscillator obtained in Examples 34 and 35.

The laser oscillator 11 as shown in FIG. 2 has a mirror 12 having transmittivity of 80% for 800 nm-band light and reflectivity of 99.8% or more for 2.7 μm-band light, and a mirror 13 having reflectivity of 99% for 2.7 μm-band light. The laser medium 14 formed of the polished halide laser glass has polished planes 15 and 16 arranged between the mirrors 12 and 13 so as to face to the mirrors 12 and 13. A focusing system 19 for light (802 nm) from a laser diode 18 driven by a laser diode driver 17, onto the polished surface 15 of the laser medium 14 through the mirror 12 is arranged opposite to the polished surface 15 of the laser medium 14 with respect to the mirror 12. Further, an infrared filter 20 for absorbing light from the laser diode 18 and passing 2.7 μm-band light is arranged opposite to the polished surface 16 of the laser medium 14 with respect to the mirror 13. The laser medium 14 is excited by light emitted from the laser diode 18 and focused onto the polished surface 15 by the focusing system 19.

The laser oscillator 11 was subjected to laser oscillation test while the magnitude of launched power of the laser diode 18 was changed to various values. The input-output characteristic of the laser medium in the test was as shown in FIG. 3.

Figure 3:
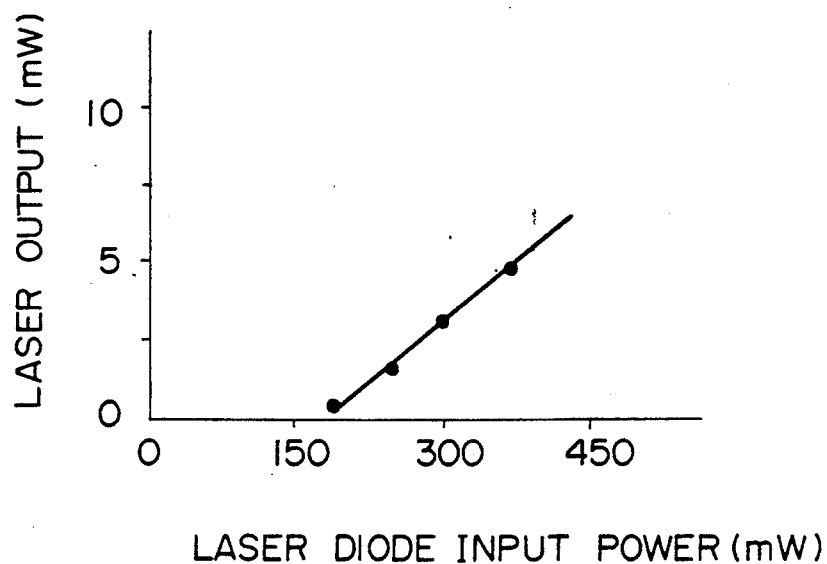
FIG. 3 is a graph view showing the input-output characteristic of a laser medium in a laser oscillator obtained in Example 34.
Figure 4:
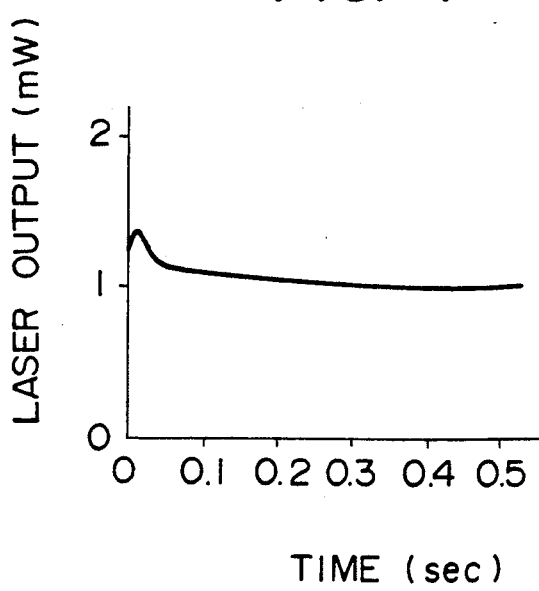
FIG. 4 is a graph view showing the change with the passage of time, of the output of a laser medium in a laser oscillator obtained in Example 35.

As was obvious from FIG. 3, laser oscillation from a low threshold of 165 mW was observed in the laser oscillator 11.

Example 35: Laser device according to the third aspect of the present invention A laser oscillator was prepared in the same manner as in Example 34 except that the halide laser glass obtained in Example 23 was used as a material for a laser medium in Example 35. The laser oscillator was subjected to laser oscillation test in the same manner as in Example 34.

As a result, laser oscillation was found when launched power of the laser diode 18 was not less than 250 mW.

Further, when launched power of the laser diode 18 was 350 mW, laser oscillation light was detected by an InAs detector. As a result, the output of the laser was observed to be stable with no spiking change of light intensity.

Example 36: Laser device according to the third aspect of the present invention First, disk-like halide laser glass having a size of 30 mmφ×10 mm was prepared in the same manner as in Example 1.

Fluorides AlF$_3$, ZrF$_4$, YF$_3$, MgF$_2$, CaF$_2$, SrF$_2$, BaF$_2$ and NaF as starting materials were weighed and mixed to prepare 40 g of a material batch for glass finally having cationic components being present in the proportions: Al ions in an amount of 25.00 mol %, Zr ions in an amount of 13.00 mol %, Ca ions in an amount of 15.00 mol %, Sr ions in an amount of 13.00 mol %, Ba ions in an amount of 13.00 mol %, Mg ions in an amount of 4.00 mol %, Y ions in an amount of 11.00 mol %, and Na ions in an amount of 6.00 mol %, and anionic components being present in the proportion: F ions in an amount of 100.00 mol %. Disk-like transparent halide glass having a size of 30 mmφ×10 mm was prepared from the material batch in the same manner as in Example 1.

The former disk-like halide laser glass and the latter disk-like transparent halide glass were respectively used as core glass and caldding glass to prepare a preform.

Figure 5:
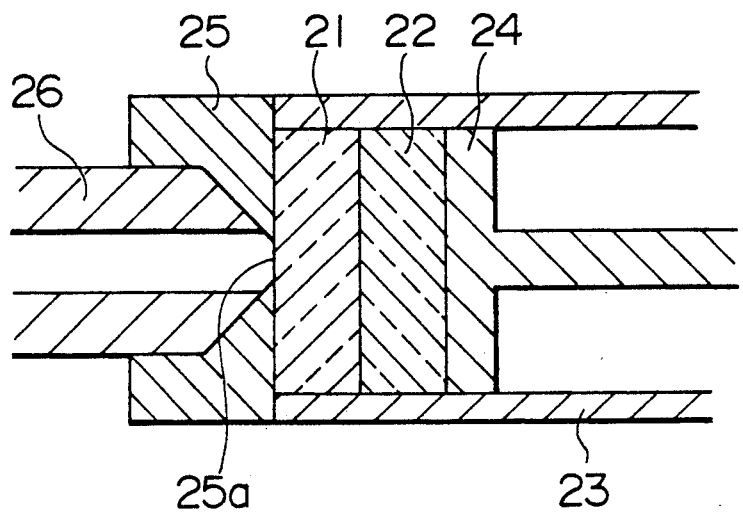
FIG. 5 is a longitudinal sectional view showing a preform extruder with caldding glass and core glass set therein.
Figure 6:
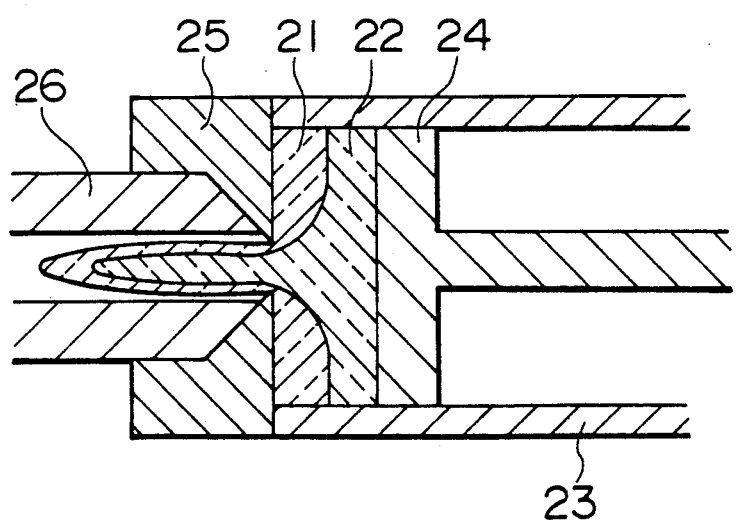
FIG. 6 is a longitudinal sectional view showing the condition in which a preform is being formed.

The preform was prepared by an extruder as shown in FIGS. 5 and 6. One surface of each of the caldding glass 21 (disk-like transparent halide glass) and the core glass 22 (disk-like halide glass) was polished with surface flatness of λ/2 or more. Then, the polished surfaces were brought into optical contact with each other in a clean booth. The two pieces of glass 21 and 22 were put into a cylinder having an internal diameter of about 35 mm so that the core glass 22 was placed in a side of the extrusion punch 24. Then, the two pieces of glass were heated to 415° C. Double-structure rod glass was extruded from a 7 mm-diameter slit 25a of an extrusion portion 25 along a liner portion 26 by applying pressure of 50 bar to the extrusion punch 24 to prepare a preform.

The preform thus obtained had a cladding diameter of 7.3 mmφ, a core diameter of 5.8 mmφ and a length of 300 mm.

Then, the preform was coated with Teflon FEP (Trade name: produced by Du Pont) and wiredrawn to prepare halide laser glass fiber having a cladding diameter of 140 μm and a core diameter of 110 μm.

Then, the halide laser glass fiber was fixed, by epoxy resin, into a glass capillary having an internal diameter of 200 μm and an external diameter of 1.8 mm and further fixed, by similar epoxy resin, into a glass tube having an internal diameter of 2 mm and an external diameter of 7 mm. Then, the halide laser glass fiber in the glass tube was cut into a length of 20 mm together with the glass tube and polished to make opposite end surfaces plane and parallel to each other to thereby prepare a rod-like halide laser glass element using the halide laser glass obtained in Example 1 as a laser medium.

Figure 7:
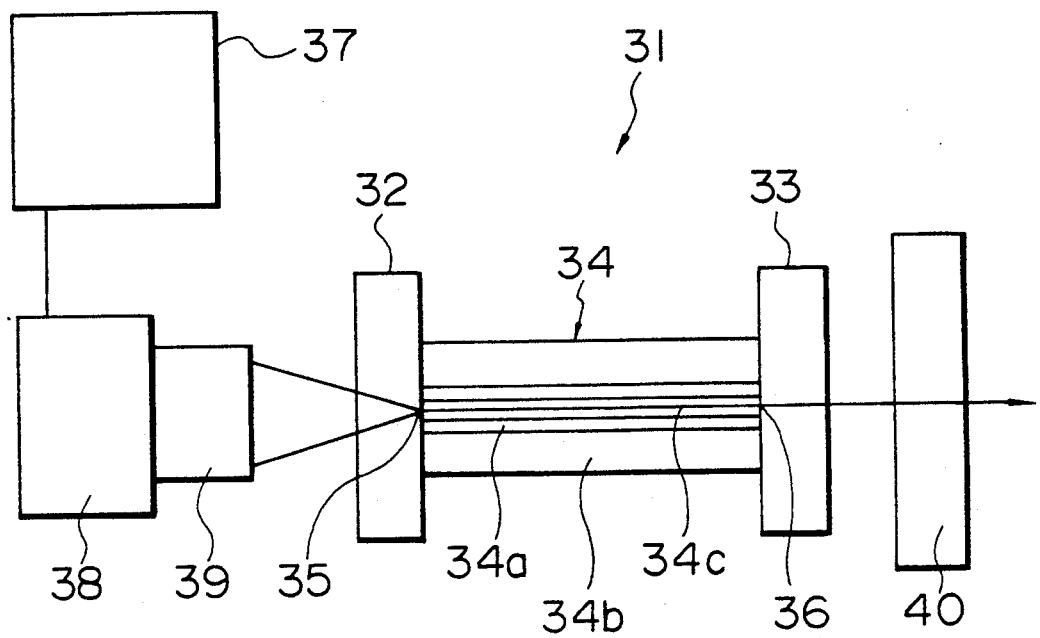
FIG. 7 is a typical diagram showing a laser oscillator obtained in Examples 36 and 37.

By using the rod-like halide laser glass element, a laser oscillator as shown in FIG. 7 was produced.

The laser oscillator 31 as shown in FIG. 7 has a mirror 32 having transmittivity of 80% for 800 nm-band light and reflectivity of 99.8% or more for 2.7 μm-band light, and a mirror 33 having reflectivity of 99% for 2.7 μm-band light. The halide laser glass element 34 having the halide laser glass fiber 34c fixed into the glass tubes 34a and 34b has polished surfaces 35 and 36 arranged between the mirrors 32 and 33 so as to directly contact with the mirrors 32 and 33. On the opposite side of the surface of the mirror 32 which contacts with the polished surface 35 of the halide laser glass element 34, there is provided a focusing system 39 for light (802 nm) from a laser diode 38 driven by a laser diode driver 37, onto the polished surface of the halide laser glass (laser medium) in the halide laser glass element 34 through the mirror 32. Further, on the opposite side of the surface of the mirror 33 which contacts with the other polished surface 36 of the halide laser glass element 34, there is provided an infrared filter 40 for absorbing light from the laser diode 38 and passing 2.7 μm-band light. The halide laser glass (laser medium) in the halide laser glass element 34 is excited by light emitted from the laser diode 38 and focused by the focusing system 39.

The laser oscillator 31 was subjected to laser oscillation test while the magnitude of launched power of the laser diode 38 was changed to various values. The input-output characteristic of the halide laser glass element 34 in the test was as shown in FIG. 8.

Figure 8:
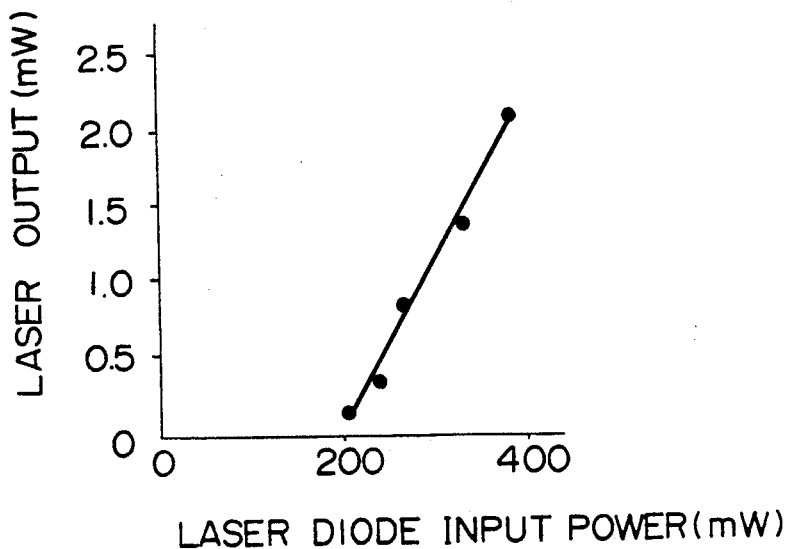
FIG. 8 is a graph view showing the input-output characteristic of a halide laser glass element in a laser oscillator obtained in Example 36.

As was obvious from FIG. 8, laser oscillation from a low threshold of 200 mW was observed in the laser oscillator 31.

Example 37: Laser device according to the third aspect of the present invention

First, disk-like halide laser glass having a size of 30 mmϕ×10 mm was prepared in the same manner as in Example 23.

Next, disk-like transparent halide glass was prepared in the same manner as in Example 36.

Then, the former disk-like halide laser glass and the latter disk-like transparent halide glass were respectively used as core glass and caldding glass to prepare a preform in the same manner as in Example 36. Further, a rod-like halide laser glass element was prepared in the same manner as in Example 36.

A laser oscillator was prepared in the same manner as in Example 36 except that the aforementioned halide laser glass element was used as the rod-like halide laser glass element.

Figure 9:
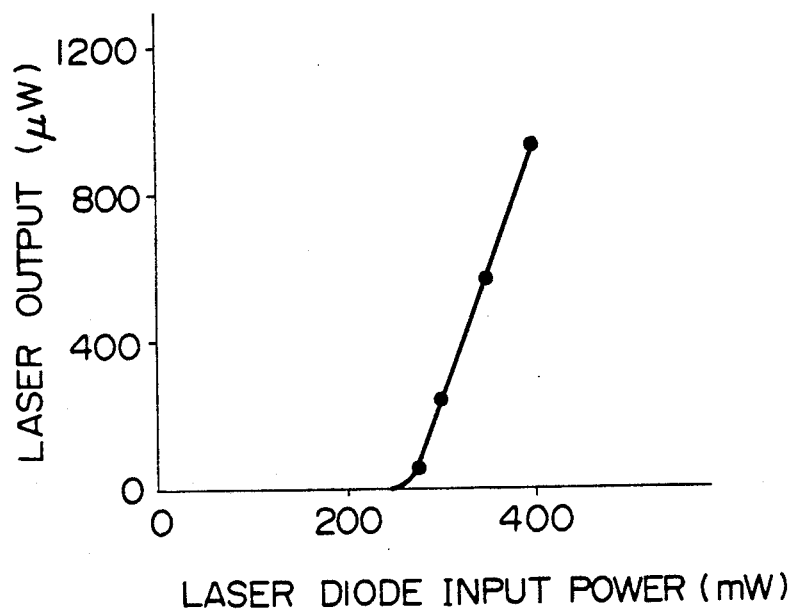
FIG. 9 is a graph view showing the input-output characteristic of a halide laser glass element in a laser oscillator obtained in Example 37.

The laser oscillator was subjected to laser oscillation test in the same manner as in Example 36. As a result, laser oscillation was confirmed when launched power of the laser diode was not less than 280 mW. The input-output characteristic of the halide laser glass element in the laser oscillator was as shown in FIG. 9.

Figure 10:
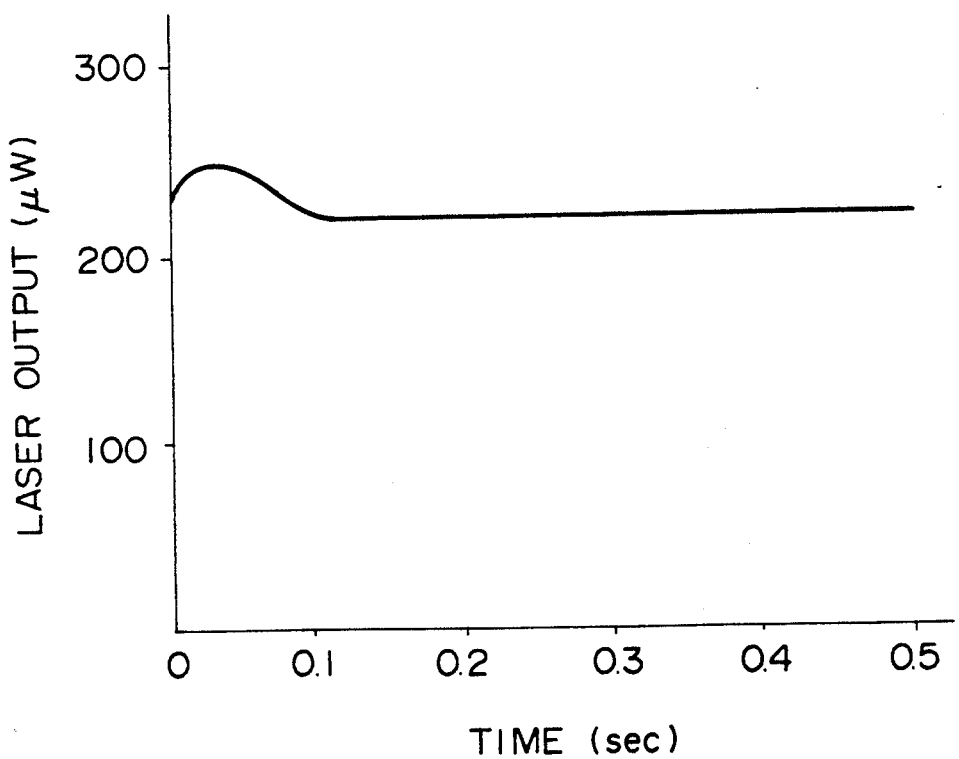
FIG. 10 is a graph view showing the change with the passage of time, of the output of a halide laser glass element in a laser oscillator obtained in Example 37.

Further, when launched power of the laser diode was 300 mW, laser oscillation light was detected by an InAs detector. As a result, the output of the laser was observed to be stable with no spiking change of light intensity as shown in FIG. 10.

Example 38: Laser system according to the third aspect of the present invention

First, a rod-like halide laser glass element was prepared in the same manner as in Example 36.

Figure 11:
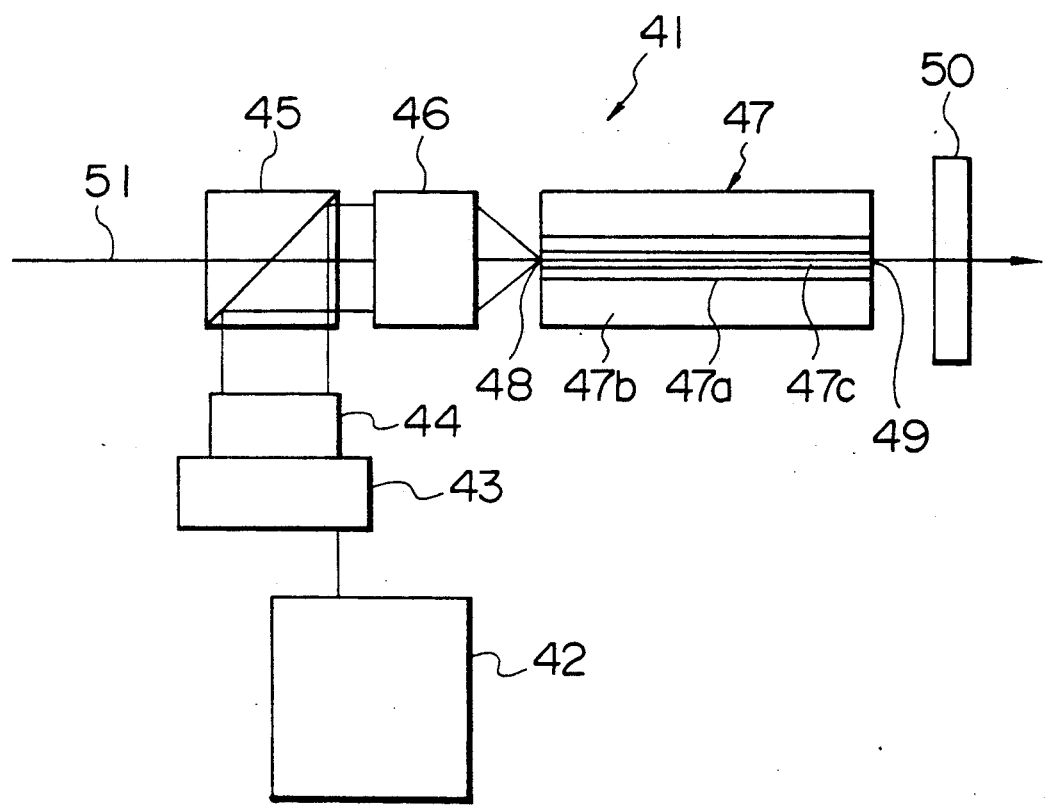
FIG. 11 is a typical diagram showing an optical amplifier obtained in Example 38.

By using the rod-like halide laser glass element, an optical amplifier as shown in FIG. 11 was prepared.

The noptical amplifier 41 as shown in FIG. 11 has a laser diode 43 driven by a laser diode driver 42, a collimating lens 44 for collimating light (wavelength: 802 nm) from the laser diode 43, a dichroic mirror 45 for reflecting light emitted from the laser diode 43 and collimated by the collimating lens 44 and for transmitting light having a wavelength of 2.7 to 2.8 μm, and a focusing system 46 for light emitted from the laser diode 43 and reflected by the dichroic mirror 45. The halide laser glass element 47 having halide laser glass fiber 47c fixed in glass tubes 47a and 47b is arranged so that the light axis thereof coincides with the light axis of the focusing system 46. In short, light focused by the focusing system 46 reach a polished surface 48 of the halide laser glass element 47. On the other hand, an infrared filter 50 for absorbing light emitted from the laser diode 43 and for transmitting light having a wavelength of 2.7 to 2.8 μm is arranged so as to face to another polished surface 49 of the halide laser glass element 47. The halide laser glass (amplification medium) in the halide laser glass element 47 is excited by light emitted from the laser diode 43 and focused by the focusing lens 46.

The amplification of laser light by the optical amplifier 41 can be carried out by focusing signal (amplified) laser light (wavelength: 2.7 to 2.8 μm) 51 to the halide laser glass element 47 by the focusing system 46 through the dichroic mirror 45 and, at the same time, exciting the halide laser glass (amplification medium) in the halide laser glass element 47 by light emitted from the laser diode 43.

Signal laser light with the wavelength of 2.72 μm and the output of 500 μW, generated from a laser oscillator prepared in the same manner as in Example 36, was amplified by the optical amplifier 41 under the condition that the output of the laser diode 43 for exciting the halide laser glass (amplification medium) was 350 mW. As a result, the amplification factor of 3.2 times was obtained.

As described above, a laser medium being safe for a person, excellent in mechanical strength and chemical durability and low in the oscillation threshold can be produced by using halide laser glass according to the present invention. Further, a laser medium also having the characteristic that a stable output can be obtained can be produced by using halide laser glass containing Er ions and Ho ions according to the present invention.

In addition, a laser device being safe for a person can be produced by applying laser glass according to the present invention thereto.

What is claimed is:

1. Halide laser glass comprising cationic components and anionic components,
in which said cationic components are constituted by: Al ions; Zr ions and/or Hf ions; at least one kind of ions selected from the first group consisting of Ca ions, Sr ions and Ba ions; at least one kind of ions selected from the second group consisting of Mg ions, Y ions and alkali metal ions; and Er ions, said cationic components being present within the ranges: Al ions in a range of from 20 to 45 mol %, Zr ions and/or Hf ions in a range of from 0.5 to 25 mol %, Ca ions in a range of from 0 to 42 mol %, Sr ions in a range of from 0 to 25 mol %, Ba ions in a range of from 0 to 25 mol % in a total amount of the first group cations within the range of 20 to 70 mol %, Mg ions in a range of from 0 to 15 mol %, Y ions in a range of from 0 to 20 mol %, alkali metal ions in a range of from 0 to 20 mol % in a total amount of the second group cations within the range of 2 to 50 mol %, and Er ions in a range of from 6 to 25 mol %, and in which said anionic components are constituted by F ions or F ions and Cl ions, said anionic components being present within the ranges: F ions in a range of from 90 to 100 mol %, and Cl ions in a range of from 0 to 10 mol %.

2. Halide laser glass comprising cationic components and anionic components, in which said cationic components are constituted by: Al ions; Zr ions and/or Hf ions; at least one kind of ions selected from the first group consisting of Ca ions, Sr ions and Ba ions; at least one kind of ions selected from the second group consisting of Mg ions, Y ions and alkali metal ions; Er ions; and Ho ions, said cationic components being present within the ranges: Al ions in a range of from 20 to 45 mol %, Zr ions and/or Hf ions in a range of from 0.5 to 25 mol %, Ca ions in a range of from 0 to 42 mol %, Sr ions in a range of from 0 to 25 mol %, Ba ions in a range of from 0 to 25 mol % in a total amount of the first group cations within the range of 20 to 70 mol %, Mg ions in a range of from 0 to 15 mol %, Y ions in a range of from 0 to 20 mol %, alkali metal ions in a range of from 0 to 20 mol % in a total amount of the second group cations within the range of 2 to 50 mol %, Er ions in a range of from 6 to 25 mol %, and Ho ions in a range of from 0.1 to 5 mol %, and in which said anionic components are constituted by F ions or F ions and Cl ions, said anionic components being present within the ranges: F ions in a range of from 90 to 100 mol %, and Cl ions in a range of from 0 to 10 mol %.

3. Halide laser glass according to claim 2, wherein the content of Ho ions is 0.8 mol % or more.

4. A laser oscillator comprising a laser medium, a light source for exciting the laser medium, a first mirror and a second mirror; said laser medium being arranged between the first and second mirrors; and said first mirror being arranged between the light source and the laser medium, whereby a light from the light source is irradiated to the laser medium through the first mirror, and a laser light oscillated from the laser medium is output through the second mirror, wherein said laser medium comprises a halide laser glass comprising cationic components and anionic components, in which said cationic components are constituted by: Al ions; Zr ions, Hf ions or mixtures thereof wherein at least one kind of said ions is selected from a first group consisting of Ca ions, Sr ions and Ba ions; at least one kind of said ions is selected from a second group consisting of Mg ions, Y ions and alkali metal ions; and Er ions, said cationic components being present within the following ranges: Al ions in a range of from 20 to 45 mol %, Zr ions or Hf ions or both Zr and Hf in a range of from 0.5 to 25 mol %, Ca ions in a range of from 0 to 42 mol %, Sr ions in a range of from 0 to 25 mol %, Ba ions in a range of from 0 to 25 mol %, wherein the total amount of the first group of cations is within the range of 20 to 70 mol %, Mg ions in a range of from 0 to 15 mol %, Y ions in a range of from 0 to 20 mol %, alkali metal ions in a range of from 0 to 20 mol % wherein the total amount of the second group of cations is within the range of 2 to 50 mol %, and Er ions are in a range of from 6 to 25 mol %, and in which said anionic components are constituted by F ions or F ions and Cl ions, said anionic components being present within the ranges: F ions in a range of from 90 to 100 mol %, and Cl ions in a range of from 0 to 10 mol %.

5. A laser oscillator comprising a laser medium, a light source for exciting the laser medium, a first mirror and a second mirror; said laser medium being arranged between the first and second mirrors; and said first mirror being arranged between the light source and the laser medium, whereby a light from the light source is irradiated to the laser medium through the first mirror, and a laser light oscillated from the laser medium is output through the second mirror, wherein said laser medium comprises a halide laser glass comprising cationic components and anionic components, in which said cationic components are constituted by: Al ions, Zr ions, Hf ions or mixtures thereof; at least one kind of said ions is selected from a first group consisting of Ca ions, Sr ions and Ba ions; at least one kind of said ions is selected from a second group consisting of Mg ions, Y ions and alkali metal ions; Er ions; and Ho ions, said cationic components being present within the ranges: Al ions in a range of from 20 to 45 mol %, Zr ions or Hf ions or both Zr and Hf ions in a range of from 0.5 to 25 mol %, Ca ions in a range of from 0 to 42 mol %, Sr ions in a range of from 0 to 25 mol %, Ba ions in a range of from 0 to 25 mol %, wherein the total amount of the first group of cations is within the range of 20 to 70 mol %, Mg ions in a range of from 0 to 15 mol %, Y ions in a range of from 0 to 20 mol %, alkali metal ions in a range of from 0 to 20 mol %, and wherein the total amount of the second group of cations is within the range of .2 to 50 mol %, Er ions in a range of from 6 to 25 mol %, and Ho ions in a range of from 0.1 to 5 mol %, and in which said anionic components are constituted by F ions or F ions and Cl ions, said anionic components being present within the ranges: F ions in a range of from 90 to 100 mol %, and Cl ions in a range of from 0 to 10 mol %.

6. A laser oscillator according to claim 5, wherein the content of Ho ions is 0.8 mol % or more.

7. A laser amplifier comprising a laser medium and a light source for exciting the laser medium, whereby a light from the light source is irradiated to the laser medium and laser light is amplified, wherein said laser medium comprises a halide laser glass comprising cationic components and anionic components, in which said cationic components are constituted by: Al ions; Zr ions, Hf ions or mixtures thereof; at least one kind of said ions is selected from a first group consisting of Ca ions, Sr ions and Ba ions; at least one kind of said ions is selected from a second group consisting of Mg ions, Y ions and alkali metal ions; and Er ions, said cationic components being present within the ranges: Al ions in a range of from 20 to 45 mol %, Zr ions, Hf ions or both Zr and Hf ions in a range of from 0.5 to 25 mol %, Ca ions in a range of from 0 to 42 mol %, Sr ions in a range of from 0 to 25 mol %, Ba ions in a range of from 0 to 25 mol %, wherein the total amount of the first group cations is within the range of 20 to 70 mol %, Mg ions in a range of from 0 to 15 mol %, Y ions in a range of from 0 to 20 mol %, alkali metal ions in a range of from 0 to 20 mol %, and wherein the total amount of the second group of cations is within the range of 2 to 50 mol %, and Er ions in a range of from 6 to 25 mol %, and in which said anionic components are constituted by F ions or F ions and Cl ions, said anionic components being present within the ranges: F ions in a range of from 90 to 100 mol %, and Cl ions in a range of from 0 to 10 mol %.

8. A laser amplifier comprising a laser medium and a light source for exciting the laser medium, whereby a light from the light source is irradiated to the laser medium, and a laser light is amplified, wherein said laser medium comprises a halide laser glass comprising cationic components and anionic components, in which said cationic components are constituted by: Al ions; Zr ions, Hf ions or mixtures thereof; at least one kind of said ions is selected from a first group consisting of Ca ions, Sr ions and Ba ions; at least one kind of said ions is selected from a second group consisting of Mg ions, Y ions and alkali metal ions; Er ions; and Ho ions, said cationic components being present within the ranges: Al ions in a range of from 20 to 45 mol %, Zr ions and/or Hf ions in a range of from 0.5 to 25 mol %, Ca ions in a range of from 0 to 42 mol %, Sr ions in a range of from 0 to 25 mol %, Ba ions in a range of from 0 to 25 mol %, wherein the total amount of the first group cations within the range of 20 to 70 mol %, Mg ions in a range of from 0 to 15 mol %, Y ions in a range of from 0 to 20 mol %, alkali metal ions in a range of from 0 to 20 mol %, and wherein the total amount of the second group of cations is within the range of 2 to 50 mol %, Er ions in a range of from 6 to 25 mol %, and Ho ions in a range of from 0.1 to 5 mol %, and in which said anionic components are constituted by F ions or F ions and Cl ions, said anionic components being present within the ranges: F ions in a range of from 90 to 100 mol %, and Cl ions in a range of from 0 to 10 mol %.

9. A laser amplifier according to claim 8, wherein the content of Ho ions is 0.8 mol % or more.

* * * * *